(12) United States Patent
Wizikowski

(10) Patent No.: US 8,616,423 B2
(45) Date of Patent: Dec. 31, 2013

(54) HELOSTRAP 525

(75) Inventor: Paul William Wizikowski, Tulsa, OK (US)

(73) Assignee: Helo LLC, Tulsa, OK (US)

( * ) Notice: Subject to any disclaimer, the term of this patent is extended or adjusted under 35 U.S.C. 154(b) by 403 days.

(21) Appl. No.: 12/797,601

(22) Filed: Jun. 9, 2010

(65) Prior Publication Data

US 2011/0303709 A1 Dec. 15, 2011

(51) Int. Cl.
- A44C 5/00 (2006.01)
- A44C 5/18 (2006.01)
- A45C 13/30 (2006.01)
- A45F 5/00 (2006.01)

(52) U.S. Cl.
USPC ........... 224/218; 224/219; 224/221; 224/222; 224/267

(58) Field of Classification Search
USPC ................. 224/218, 219, 221, 222, 267, 650, 224/901.4, 930
See application file for complete search history.

(56) References Cited

U.S. PATENT DOCUMENTS

| | | | | |
|---|---|---|---|---|
| 4,136,805 A * | 1/1979 | Storms | | 224/219 |
| 5,052,602 A * | 10/1991 | Duchi et al. | | 224/218 |
| 5,412,545 A * | 5/1995 | Rising | | 362/105 |
| 6,360,928 B1 * | 3/2002 | Russo | | 224/218 |
| 6,726,070 B2 * | 4/2004 | Lautner | | 224/221 |
| 7,191,926 B1 * | 3/2007 | Costantino et al. | | 224/605 |
| 7,237,756 B2 * | 7/2007 | Isenberg | | 248/451 |
| 7,296,752 B2 * | 11/2007 | Carnevali | | 235/462.44 |
| 7,469,809 B2 * | 12/2008 | Rodarte et al. | | 224/578 |
| 7,942,293 B2 * | 5/2011 | Lawrence et al. | | 224/218 |
| D650,531 S * | 12/2011 | Young et al. | | D29/120.1 |
| 8,140,131 B1 * | 3/2012 | Green | | 455/575.1 |
| D673,162 S * | 12/2012 | Young | | D14/447 |
| 8,328,055 B1 * | 12/2012 | Snyder | | 224/197 |
| 2007/0205236 A1 * | 9/2007 | Partusch | | 224/250 |
| 2008/0017678 A1 * | 1/2008 | Anderson et al. | | 224/221 |
| 2009/0219677 A1 * | 9/2009 | Mori et al. | | 361/679.03 |
| 2009/0321483 A1 * | 12/2009 | Froloff | | 224/267 |
| 2012/0024917 A1 * | 2/2012 | Case et al. | | 224/259 |
| 2012/0327030 A1 * | 12/2012 | Hsieh et al. | | 345/175 |

* cited by examiner

Primary Examiner — Nathan J Newhouse
Assistant Examiner — Lester L Vanterpool
(74) Attorney, Agent, or Firm — Miles & Stockbridge P.C.; David R. Schaffer, Esq.

(57) ABSTRACT

The invention attaches a hand strap to a tablet to secure the tablet to the user's hand and act as an aide to prevent a tablet from being dropped. The invention allows the user to rotate the tablet to various viewing angles while still maintaining the secure connection to the tablet. The connection point provides a single yet strong connection between the hand strap and device grip for the two to rotate around each other.

18 Claims, 7 Drawing Sheets

HELOSTRAP 525

CROSS-REFERENCE TO RELATED APPLICATIONS

[Information Needed]

STATEMENT REGARDING FEDERALLY SPONSORED RESEARCH OR DEVELOPMENT

The invention is not subject to any rights, claims, or licenses to the invention by any federal, state, or local governmental agencies.

REFERENCE TO SEQUENCE LISTING, A TABLE, OR A COMPUTER PROGRAM LISTING COMPACT DISC APPENDIX

Not Applicable.

BACKGROUND OF THE INVENTION

The invention is a holding or carrying aide. It provides a user with a hand strap which easily attaches to a tablet and allows the tablet to rotate freely in the user's hand. With the advancement of expensive handheld electronic tablets (i.e. "iPad"©), the need to be able to securely hold and stabilize tablets without the risk of dropping them has increased significantly. No prior inventions address the issue of being able to hold a tablet (electronic or otherwise) in this manner.

BRIEF SUMMARY OF THE INVENTION

The invention is a mechanical device used to grip or secure flat rectangular objects (tablets) for hand-held use and allows them to rotate freely in the user's hand. The invention is a device which secures to a tablet (electronic or otherwise) and provides a hand strap to secure the tablet to the user's hand. The Hand Strap is connected to a strap secured on the device (Device Grip) by a pivot point which allows the user to rotate the tablet to different viewing angles without changing their hand position. The Device Grip is secured to the tablet by two circular bands of stretchable material (rubber or elastic) on each end of the Device Grip. Both bands of one end extend around one corner of the tablet while the bands on the other end of the Device Grip extend around the corner of the tablet diagonally across from the first corner.

DETAILED DESCRIPTION OF THE INVENTION

The invention is a mechanical device used to grip or secure flat rectangular objects (tablets) for hand-held use. The invention is a device which secures to a tablet (electronic or otherwise) and provides a hand strap to secure the tablet to the user's hand. The Hand Strap is connected to a Device Grip (a strap secured on the tablet) by a pivot point which allows the user to rotate the tablet without changing the angle of the hand strapped to the device. The Device Grip is secured to the tablet by two circular bands of stretchable material (rubber or elastic) on each end of the Device Grip. Both bands of one end extend around one corner of the tablet while the bands on the other end of the Device Grip extend around the corner of the tablet diagonally across from the first corner.

The Hand Strap

Figure 2A:
FIG. 2A The HAND STRAP component for the HELO STRAP, profile view. This is designed to wrap around a users hand and attach to itself ensuring a secure fit for various hand sizes.
Figure 2B:
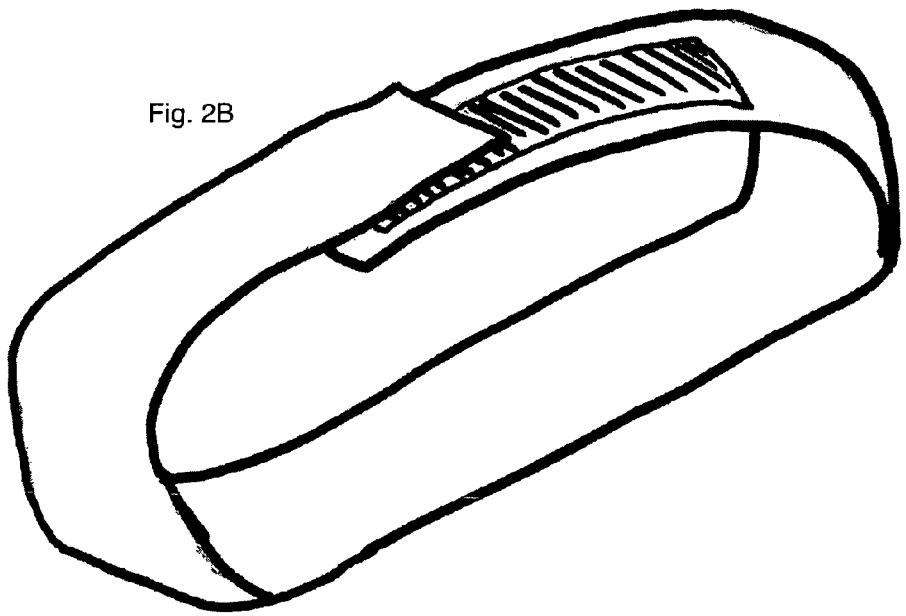
FIG. 2B The HAND STRAP component for the HELO STRAP, three-quarter view. This is designed to wrap around a users hand and attach to itself ensuring a secure fit for various hand sizes.
Figure 3A:
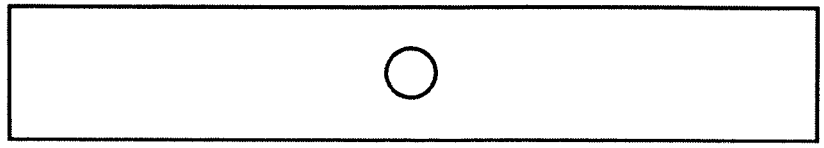
FIG. 3A The ROTATABLE CONNECTING POINT's Base Plate.
Figure 3B:
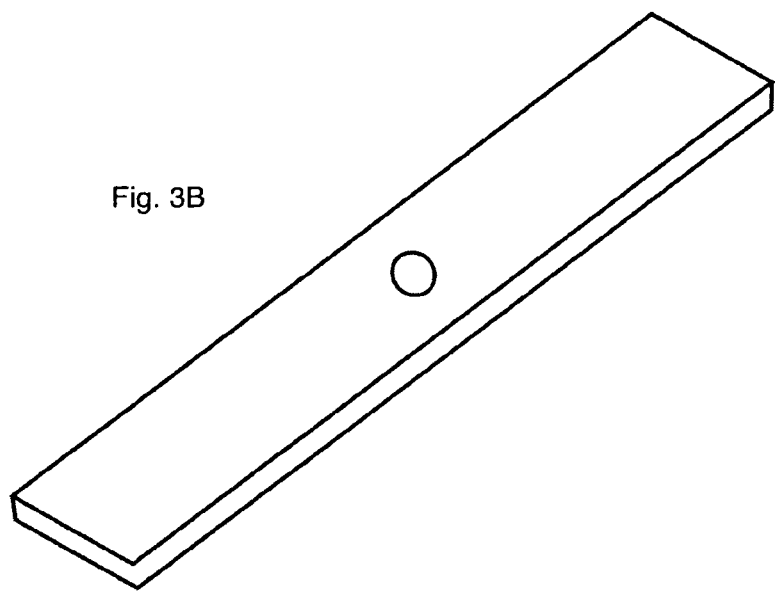
FIG. 3B The ROTATABLE CONNECTING POINT's Base Plate, three-quarter view.
Figure 3C:
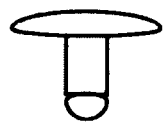
FIG. 3C The ROTATABLE CONNECTING POINT's Connecting Device.

The Hand Strap is a strip of material which contains hook and loop closures placed on either end of the strap. (See FIG. 2) When the strap is stretched flat on a solid surface, the hook material shall be attached on one end of the strap facing up. The loop side of the closure material shall be attached to the opposite end of the strap facing down. The Hand Strap is constructed to allow a wide variety of hand sizes to be accommodated.

The Device Grip

The Device Grip is the portion with attaches to the tablet. Through the RCP it also attaches to the Hand Strap, and consequently the user's hand. Thus, the invention secures the tablet to the user's hand, while still allowing it to rotate freely about one axis.

The Device Grip is secured to the tablet by two circular bands of stretchable material (rubber or elastic) on each end of the Device Grip. Both bands of one end extend around one corner of the tablet while the bands on the other end of the Device Grip extend around the corner of the tablet diagonally across from the first corner.

Figures 1A, 1B:
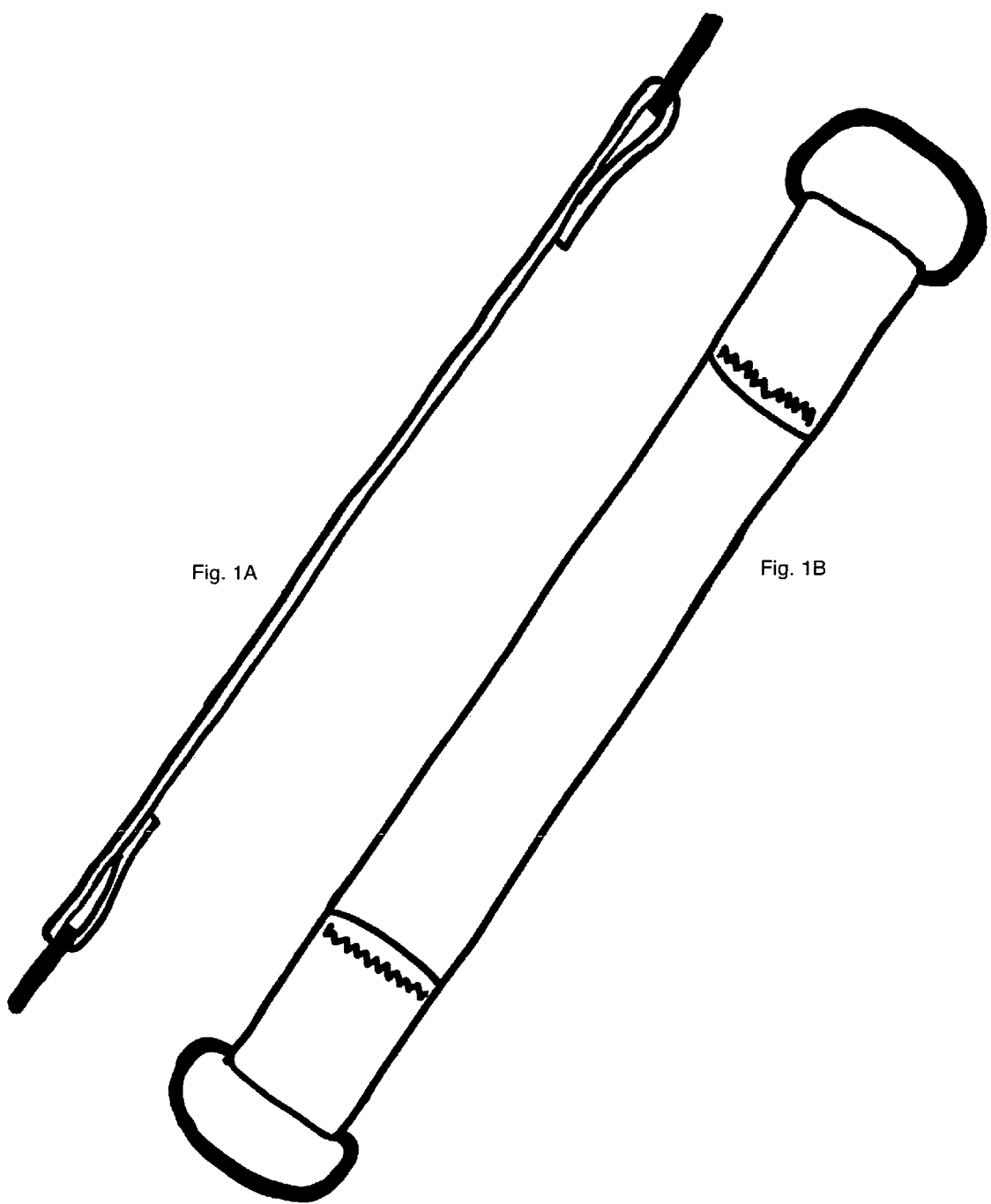
FIG. 1A The DEVICE GRIP component for the HELO STRAP, profile view. Note how each end of the main material wraps around the stretchable loops on each end and folds back under itself.
FIG. 1B The DEVICE GRIP component for the HELO STRAP, top view. Note that each end's loop is doubled up to ensure added security and tension.

The Device Grip is a strip of material which is looped back upon itself on both ends by 1.5" and sewn closed (thus forming looped ends). (See FIG. 1.) Before being sewn, two bands of stretchable material (i.e. elastic or rubber) are passed through each end of the Device Grip. When each end is sewn to form a looped end, each end will have two bands contained within the looped end.

Figure 4:
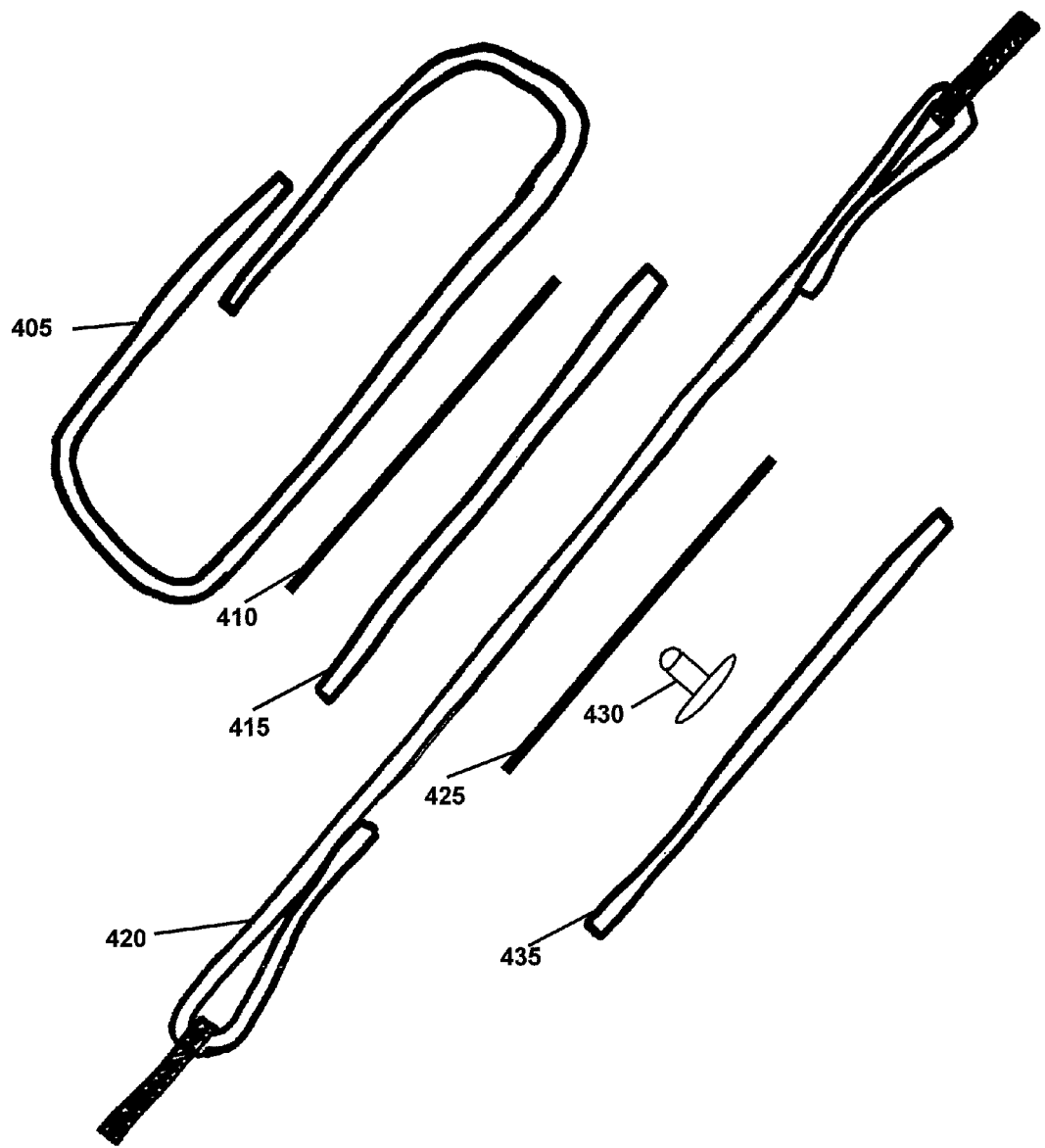
FIG. 4 is a side, exploded view of a gripping device, in accordance with an embodiment of the present invention. The gripping device includes a HAND STRAP component 405,
a ROTATABLE CONNECTING POINT Base Plate 410,
a Covering Material 415 sewn against the base of the HAND STRAP,
a DEVICE GRIP 420,
a ROTATABLE CONNECTING POINT Base Plate 425 for the Device Grip,
a ROTATABLE CONNECTING POINT Connecting Device, and
a "Covered Material" sewn against the base of the DEVICE GRIP that conceals the RCPs Device Grip Base Plate.

When the strap is stretched flat on a solid surface, the ends of the Device Grip which were sewn will be facing down. (See FIG. 4D.) In the center of the Device Grip, one half of its length, as measured from either end, is a whole to allow for the RCP.

Final Assembly

The Connecting Device of the RCP will be inserted through the Device Grip Base Plate, Device Grip, Hand Strap Base Plate Cover, and Hand Strap Base Plate. (See FIG. 4) The Connecting Device of the RCP is then securely fastened allowing the Base Plates to rotate freely around the Connecting Device.

A covering material is placed under the Device Grip Base Plate and the RCP. This covering material is then attached (sewn) to the Device Grip, thus covering the Device Grip Base Plate and the RCP. (See FIG. 4G.)

The Hand Strap is then sewn to the Hand Strap Base Plate Cover thereby attaching the Hand Strap to the Device Grip through the RCP.

Usage

Figure 5:
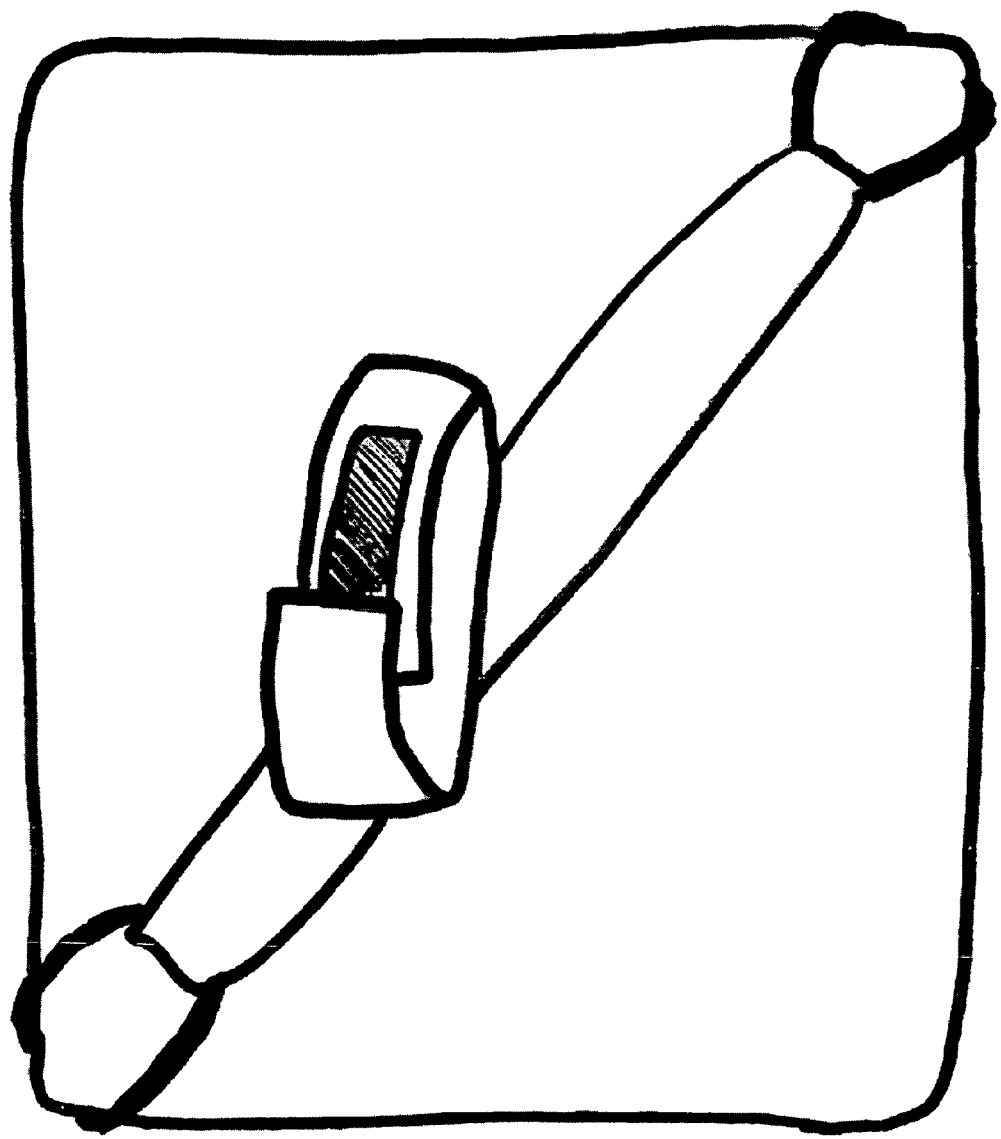
FIG. 5 The HELO STRAP as it would affix to a device, rear view.

To use the invention, stretch the two loops of stretchable material around one corner of the device. Then, lay the Device Grip side diagonally across the back of the tablet, and stretch the two loops of stretchable material around the corner of the device (the one diagonally opposite from the first). (See FIG. 5.) The user will then place their hand, palm-side toward the tablet, and secure the hand strap across the back of their hand.

Alternate

Figure 6:
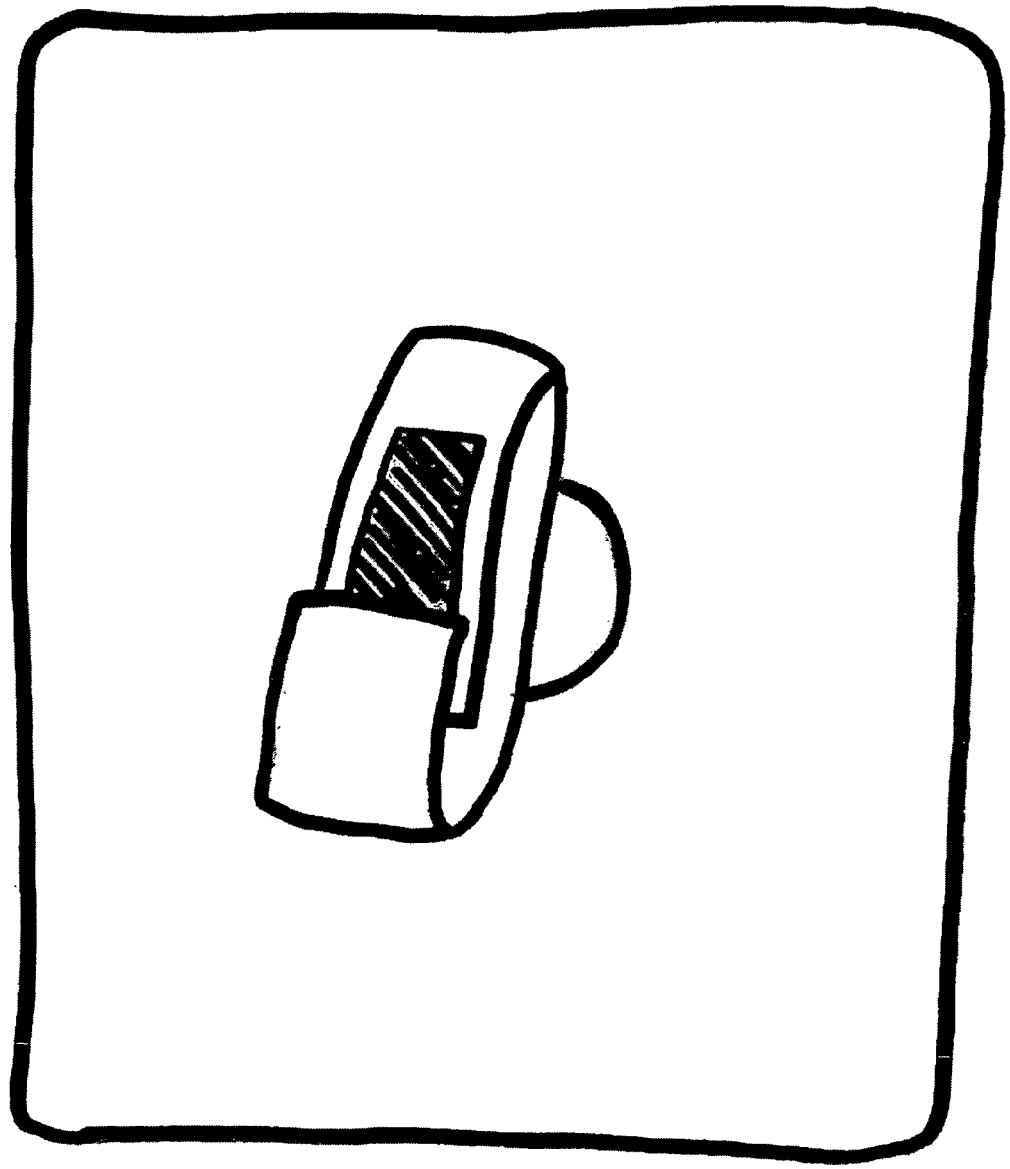
FIG. 6 The HELO STRAP utilizing a sleeve, cover, or a hardened cover case with an attached rotatable HAND STRAP, rear view.
Figure 7:
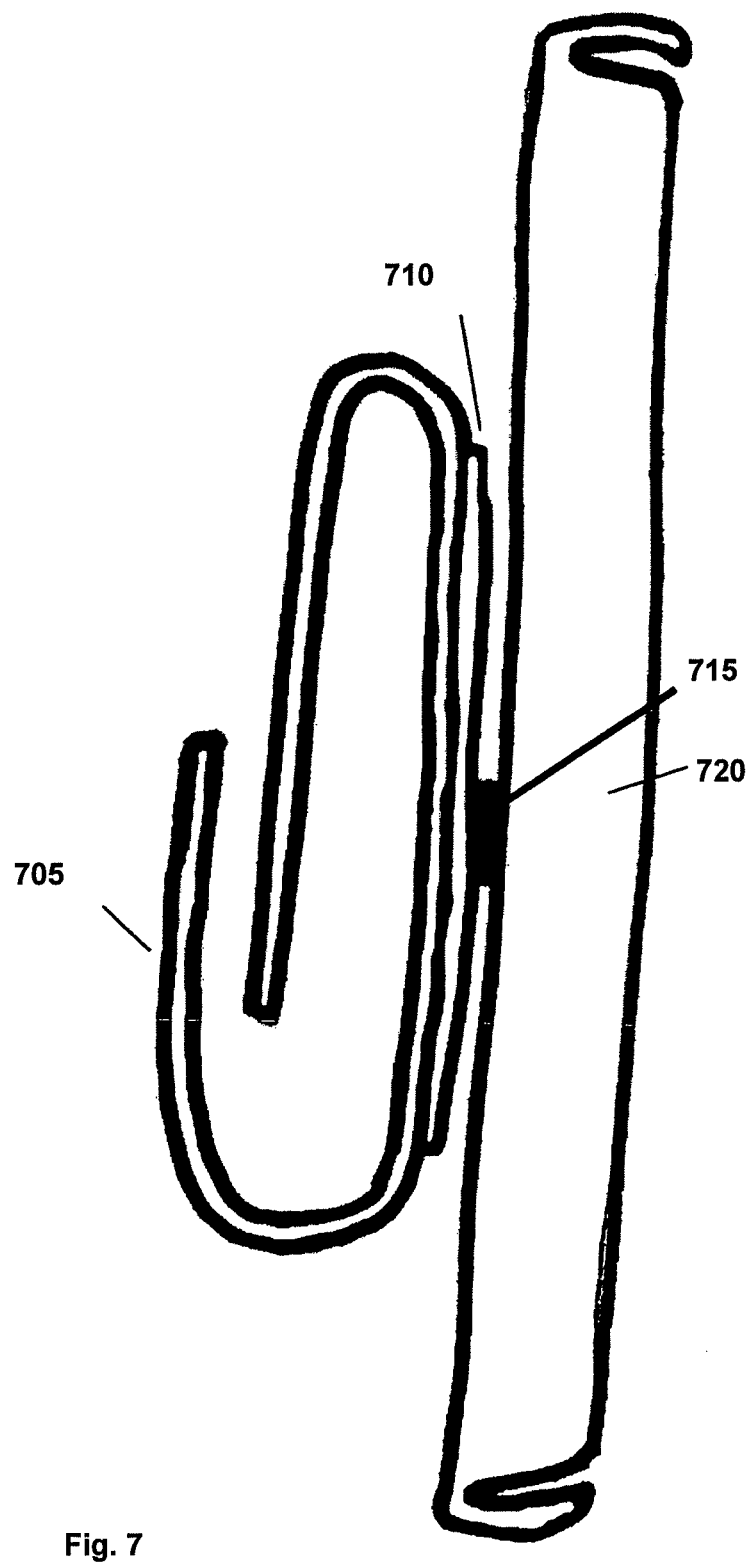
FIG. 7 is a side view of a HELO STRAP utilizing a sleeve, cover, or hardened cover case with an attached rotatable HAND STRAP, in accordance with another embodiment of the present invention. The helo strap includes four components: a HAND STRAP 705, a "Covering Material" 710, a ROTATABLE CONNECTING POINT 715, and a sleeve, cover, or hardened cover case 720.

The Hand Strap is connected to a material surrounding a tablet consisting of a sleeve, cover, or hardened case, similar to cellular telephone cases. (FIG. 6, FIG. 7.) The Hand Strap is connected to the cover via an RCP that is fixed to the material surrounding the tablet ("Cover"). Once the cover is placed on the tablet, the Helostrap is secured and ready for use.

The invention claimed is:

1. A device to grip or secure flat rectangular objects for hand-held use, the device comprising:
    a unitary strap having opposite end portions folded back on and rigidly affixed to the unitary strap where each end portion encircles and holds a portion of a stretchable circular band;
    a hand strap; and
    a connection point having two halves rotably connected to each other in a middle of the connection point between the halves and a first of the halves being fixedly attached to the unitary strap and a second of the halves being fixedly attached to the hand strap; and
    the connection point first half being fixedly attached to the unitary strap with a first cover piece of material that extends past an outer perimeter of the connection point first half, and the connection point second half being fixedly attached to the hand strap with a second cover piece of material that extends past an outer perimeter of the connection point second half.

2. The device of claim of claim 1 wherein the connection point first half includes a male connection component with at least one ribbed element and the the connection point second half includes a female connection component with at least one reciprocally ribbed element configured to receive and rotatably hold the male connection component.

3. The device of claim 1 wherein the hand strap comprises a strip of material with a loop fastener material attached at one end and on a first side of the hand strap and a hook fastener material attached at an opposite end and on a second side of the hand strap.

4. The device of claim 1 wherein each stretchable band is configured to fit over and be removably affixed to a diagonally opposite corner of the rectangular object.

5. The device of claim 1 wherein the connection point first half comprises:
    a first half flat body portion from which the male connection component extends substantially perpendicularly from substantially a center of the first half flat body portion; and
    a second half flat body portion from which the female connection component extends substantially perpendicularly from substantially a center of the second half flat body portion.

6. The device of claim 5 wherein the first half flat body portion and the second half body portion each has a substantially elongated rectangular shape.

7. A device to grip or secure flat rectangular objects for hand-held use, the device comprising:
    a unitary strap having opposite end portions folded back on and rigidly affixed to the unitary strap where each end portion encircles and holds a portion of a stretchable circular band;
    a hand strap, the hand strap including a strip of material with a loop fastener material attached at one end and on a first side of the hand strap and a hook fastener material attached at an opposite end and on a second side of the hand strap;
    a connection point having two halves rotably connected to each other in a middle of the connection point between the halves and a first half being fixedly attached to the unitary strap and a second half being fixedly attached to the hand strap, the first half including a male connection component with at least one ribbed element and the second half including a female connection component with at least one reciprocally ribbed element configured to receive and rotatably hold the male connection component; and
    the connection point first half being fixedly attached to the unitary strap with a first cover piece of material that extends past an outer perimeter of the connection point first half, and the connection point second half being fixedly attached to the hand strap with a second cover piece of material that extends past an outer perimeter of the connection point second half.

8. The device of claim 7 wherein each stretchable band is configured to fit over and be removably affixed to a diagonally opposite corner of the rectangular object.

9. The device of claim 7 wherein the connection point first half comprises:
    a first half flat body portion from which the male connection component extends substantially perpendicularly from substantially a center of the first half flat body portion.

10. The device of claim 9 wherein the first half flat body portion has a substantially rectangular shape.

11. The device of claim 10 wherein the connection point second half comprises:

a second half flat body portion from which the female connection component extends substantially perpendicularly from substantially a center of the second half flat body portion.

12. The device of claim 11 wherein the second half flat body portion has a substantially rectangular shape.

13. A device to grip or secure flat rectangular objects for hand-held use, the device comprising:

a unitary strap having opposite end portions folded back on and rigidly affixed to the unitary strap where each end portion encircles and holds a portion of a stretchable circular band and each stretchable band being configured to fit over and be removably affixed to a diagonally opposite corner of the rectangular object;

a hand strap, the hand strap including a strip of material with a loop fastener material attached at one end and on a first side of the hand strap and a hook fastener material attached at an opposite end and on a second side of the hand strap; and a connection point having two halves rotably connected to each other in a middle of the connection point between the halves and a first half being fixedly attached to the unitary strap and a second half being fixedly attached to the hand strap, the first half including a male connection component with at least one ribbed element and the second half including a female connection component with at least one reciprocally ribbed element configured to receive and rotatably hold the male connection component, and the connection point first half being fixedly attached to the unitary strap with a first cover piece of material that extends past and covers an outer perimeter of the connection point first half, and the connection point second half being fixedly attached to the hand strap with a second cover piece of material that extends past and covers an outer perimeter of the connection point second half.

14. The device of claim 13 wherein the connection point first half comprises:

a first half flat body portion from which the male connection component extends substantially perpendicularly from substantially a center of the first half flat body portion.

15. The device of claim 14 wherein the first half flat body portion has a substantially rectangular shape.

16. The device of claim 15 wherein the connection point second half comprises:

a second half flat body portion from which the female connection component extends substantially perpendicularly from substantially a center of the second half flat body portion.

17. The device of claim 16 wherein the second half flat body portion has a substantially rectangular shape.

18. The device of claim 13 wherein the male connection component includes a plurality of ribbed elements and the female connection component includes a plurality of reciprocally ribbed elements.

* * * * *